US012765562B2

(12) United States Patent
Fuhr

(10) Patent No.: US 12,765,562 B2
(45) Date of Patent: Oct. 20, 2026

(54) MULTI-LEVEL BAKING PANS

(71) Applicant: Lindsey M. Fuhr, Miami, FL (US)

(72) Inventor: Lindsey M. Fuhr, Miami, FL (US)

( * ) Notice: Subject to any disclaimer, the term of this patent is extended or adjusted under 35 U.S.C. 154(b) by 4 days.

(21) Appl. No.: 18/906,393

(22) Filed: Oct. 4, 2024

(65) Prior Publication Data

US 2025/0113830 A1 Apr. 10, 2025

Related U.S. Application Data

(63) Continuation-in-part of application No. 18/378,265, filed on Oct. 10, 2023, now Pat. No. 12,108,908.

(51) Int. Cl.
*A21B 3/13* (2006.01)
*A47J 37/01* (2006.01)

(52) U.S. Cl.
CPC ................. *A21B 3/13* (2013.01); *A47J 37/01* (2013.01)

(58) Field of Classification Search
CPC .... A21B 3/13; A21B 3/15; A47J 37/01; A47J 36/16; A47J 36/025; A47J 36/027; B65D 1/34; B65D 1/36; B44D 3/126
USPC ... 220/573.1, 573.4, 23.87, 23.88, 627, 636, 220/912; 206/557
See application file for complete search history.

(56) References Cited

U.S. PATENT DOCUMENTS 346,808 A 8/1886 Doebler
1,531,569 A * 3/1925 Rade ........................ A21B 3/13 249/102
3,729,764 A * 5/1973 Vines ..................... B44D 3/126 15/257.06
4,373,511 A 2/1983 Miles et al.
4,529,089 A 7/1985 Gasbarra et al.
7,288,745 B2 * 10/2007 Colonna .................. F25D 3/08 62/457.6
12,108,908 B1 10/2024 Fuhr
2005/0263013 A1 12/2005 Siegel et al.
2015/0336422 A1 * 11/2015 Tuzi ...................... B44D 3/126 220/570

FOREIGN PATENT DOCUMENTS

DE 29905157 U1 6/1999

* cited by examiner

*Primary Examiner* — Jeffrey R Allen
*Assistant Examiner* — Elizabeth J Volz
(74) *Attorney, Agent, or Firm* — Harness, Dickey & Pierce, P.L.C.; Anthony G. Fussner

(57) ABSTRACT

Exemplary embodiments are disclosed of multi-level baking pans, such as a two-level baking pan for baking brownies or another product having different levels of doneness in the same pan. In exemplary embodiments, a baking pan for baking a product having different levels of doneness comprises first and second bottom portions. The first bottom portion is at a first depth from and generally parallel with an upper edge of the baking pan. The second bottom portion is generally parallel with the upper edge of the baking pan. The second bottom portion is at a second depth from the upper edge of the baking pan that is different than the first depth of the first bottom portion from the upper edge. The first and second bottom portions are unobstructed from each other.

1 Claim, 4 Drawing Sheets

MULTI-LEVEL BAKING PANS

CROSS-REFERENCE TO RELATED APPLICATION

This application is a continuation-in-part of allowed U.S. patent application Ser. No. 18/378,265 filed Oct. 10, 2023, which issues as U.S. Pat. No. 12,108,908 on Oct. 8, 2024. The entire disclosure of the above application is incorporated herein by reference.

FIELD

The present disclosure relates to multi-level baking pans, such as a two-level baking pan for baking brownies or another product having two different levels of doneness in the same pan.

BACKGROUND

This section provides background information related to the present disclosure which is not necessarily prior art.

Baking pans for baking cake, bread, banana bread, pie, or other baked goods such as brownies are usually generally rectangular metal or glass pans having a depth of between 1 and 2 inches. In the case of brownies, for example, the baker simply pours brownie mix into the pan and then bakes in an oven at 350 degrees for 15 to 20 minutes or until the desired level of doneness is achieved. This time and temperature likely changes depending on the material being baked (e.g., cake, brownies, banana bread, etc.)

But some people like chewy soft brownies while other people like harder, more cakelike brownies. The difference between chewy and cakelike brownies generally is determined by the amount of time the brownies are baked in an oven. To achieve different levels of doneness, this then requires the baker to use two separate pans in the oven for different amounts of time. This can lead to a waste of the brownies that are not sufficiently done or a waste of those that appear to be overdone. What is needed is a single baking dish that can accommodate baking for both preferences of different people at the same time.

DRAWINGS

The drawings described herein are for illustrative purposes only of selected embodiments and not all possible implementations, and are not intended to limit the scope of the present disclosure.

Corresponding reference numerals may indicate corresponding (but not necessarily identical) parts throughout the several views of the drawings.

DETAILED DESCRIPTION

Figure 1:
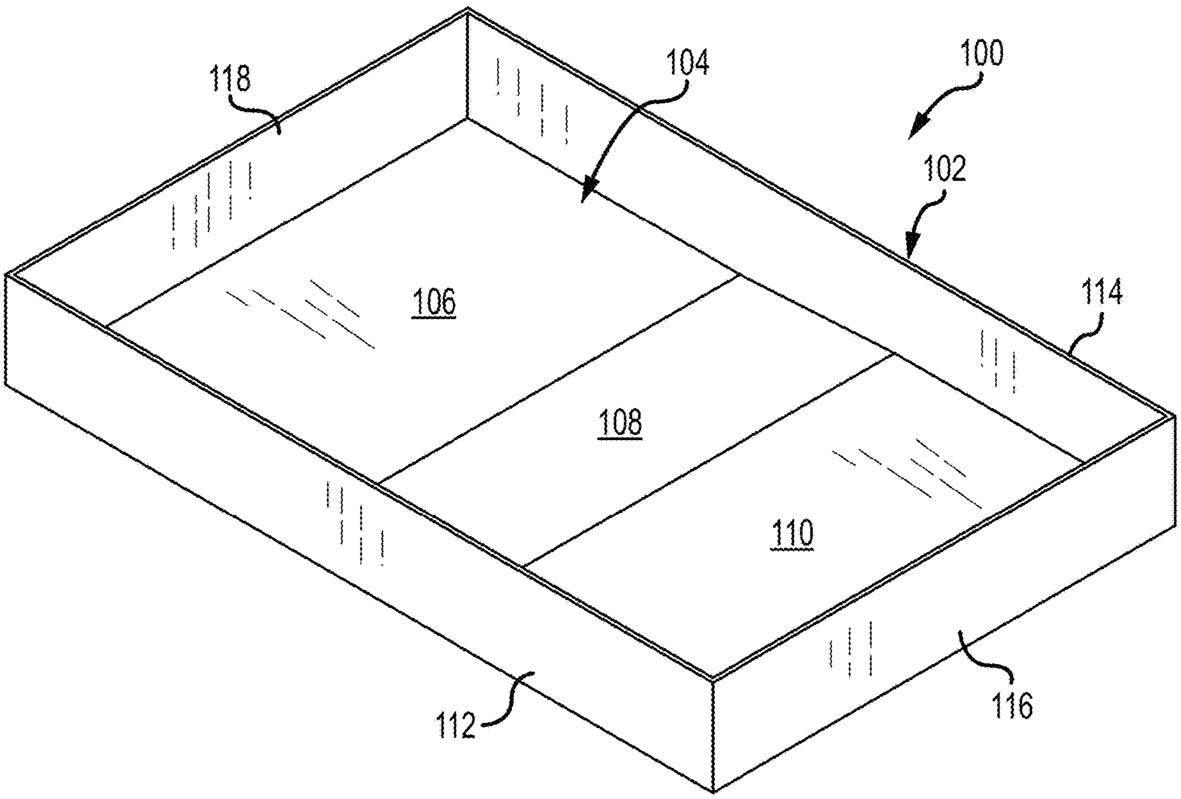
FIG. 1 is a perspective view of a first embodiment of a baking pan in accordance with the present disclosure.

Exemplary embodiments will now be described more fully with reference to the accompanying drawings.

Disclosed herein are exemplary embodiments of multi-level baking pans, such as a two-level baking pan for baking brownies or another product having two different levels of doneness in the same pan. In an exemplary embodiment, a baking pan includes an open top box shaped body having an upper edge defining a plane. A bottom of the body is spaced apart from the upper edge. The bottom includes first and second bottom portions at respective first and second different depths from the upper edge. The first and second bottom portions are generally parallel to the plane defined by the upper edge. The baking pan preferably further includes a transition portion between the first bottom portion and the second bottom portion. The transition portion may be an inclined surface, vertical surface, etc.

The baking pan typically has a depth of between about 1 inch and about 3 inches. And there is a depth difference between the first bottom portion and the second bottom portion between about ¼ inch and about ½ inch. The first and second bottom portions may be flat. In an exemplary embodiment, a length of the first bottom portion is preferably equal to a length of the second bottom portion. Alternatively, the length of the first bottom portion may be different (shorter or longer) than a length of the second portion.

An exemplary embodiment of a baking pan may alternatively be viewed as an open top hollow body having an upper edge defining a plane. A bottom of the open top hollow body includes first and second flat bottom portions. The first flat bottom portion is generally parallel to the plane defined by the upper edge. The first flat bottom portion is spaced a first distance from the upper edge. The second flat bottom portion is also generally parallel to the plane defined by the upper edge. And the second flat bottom portion is spaced a second distance from the upper edge. A transition portion is between the first and second flat bottom portions. The transition portion may be inclined, vertical, etc.

In exemplary embodiments, the baking pan includes four side walls having upper edges collectively defining a closed rectangular shape. The side walls may be vertical or sloped. Other shapes (e.g., non-rectangular, etc.) are also envisioned for the baking pan. Preferably, at least two opposite side walls of the baking pan terminate in bottom straight edges so that the baking pan lies level when placed on a level oven rack.

Alternatively, a baking pan in accordance with the present disclosure may be viewed as an open top box shaped body having a closed upper edge defining a plane and a flat bottom generally parallel to the plane. The baking pan may include a flat insert shaped to fit onto the flat bottom within the open top box shaped body. When positioned within the baking pan, the open top box shaped body includes a first bottom portion that is integrally defined by the bottom and adjacent the insert. The insert defines a second bottom portion within the open top box shaped body that is spaced apart from the first bottom portion. The second bottom portion is the upper surface of the insert. The insert preferably has a tapered edge for transitioning from the upper surface of the insert that defines the second bottom portion to the flat bottom of the body.

With reference now to the figures, an exemplary first embodiment of a baking pan 100 in accordance with the present disclosure is shown in FIGS. 1-4. This example baking pan 100 is an open top box shaped pan that has a rectangular peripheral top edge 102 defining a plane and preferably has a side wall height of about 1¾ inches, a length of about 13 inches, and a width of about 9 inches. This baking pan 100 has a bottom 104 configured with a flat first bottom portion 106 at a depth of about 1¾ inches from the top edge 102 of the pan 100, an inclined transition portion 108, and a flat second bottom portion 110 raised about ¼ inch from the flat first bottom portion 106. The transition portion preferably smoothly merges the first flat bottom portion 106 with the second flat bottom portion 108 and preferably has a width of about 1 inch to about 3 inches. The specific dimensions provided in this paragraph and elsewhere are examples only and do not limit the scope of the present disclosure. In alternative embodiments, the baking pan 100 may be configured differently, e.g., dimensionally sized larger or smaller, shaped differently (e.g., non-rectangular, etc.), configured to have more than two levels, etc.

Figure 2:
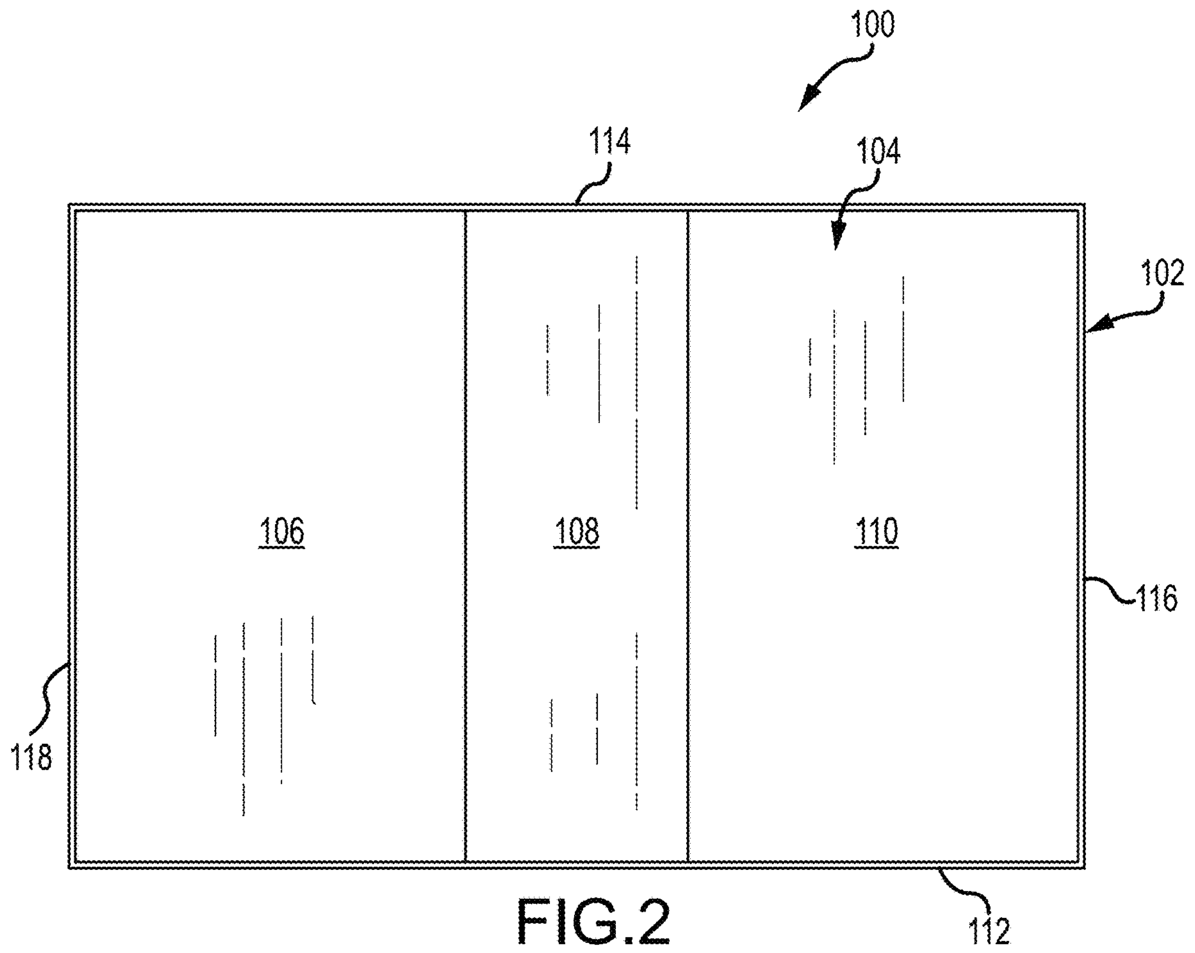
FIG. 2 is a plan view of the baking pan shown in FIG. 1.

A plan view of the exemplary baking pan 100 is shown in FIG. 2. The pan 100 has a first side wall 112, a second side wall 114, a first end wall 116, and a second end wall 118. Each of the side walls 112, 114 and the end walls 116, 118 join the bottom 104. The upper edges of the side walls 112, 114 and end walls 116, 118 together form or define a peripheral top edge 102. The bottom edges 120 of at least the side walls 112, 114 and the end wall 118 lie in a plane generally parallel to the top edge 102 of the pan 100. The bottom edge of the end wall 116 may be above (e.g., about ¼ inch above, etc.) the bottom edges of the side walls 112, 114 as shown in the cross-sectional view of FIG. 4. Alternatively, the second bottom portion 110 of the bottom 104 may be butted against the first end wall 116 during fabrication such that the bottom edge of the first end wall 116 matches the bottom edge of the first and second side walls 112, 114.

Figure 3:
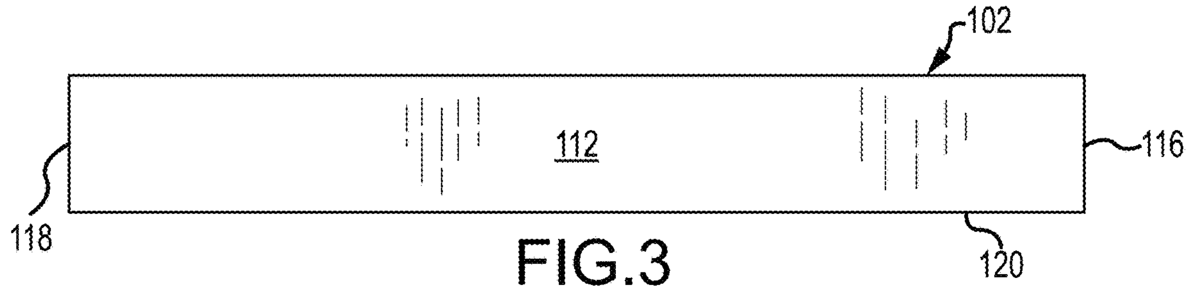
FIG. 3 is a side view of the baking pan shown in FIG. 1.
Figure 4:
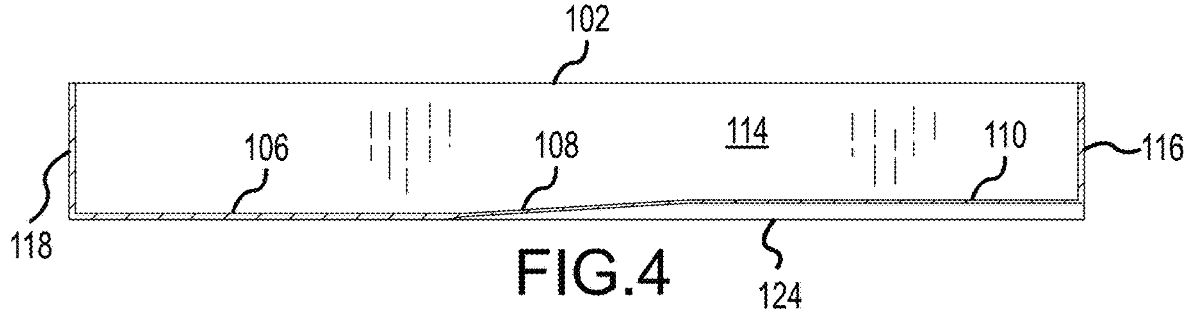
FIG. 4 is a cross-sectional view of the baking pan shown in FIG. 1.
Figure 5:
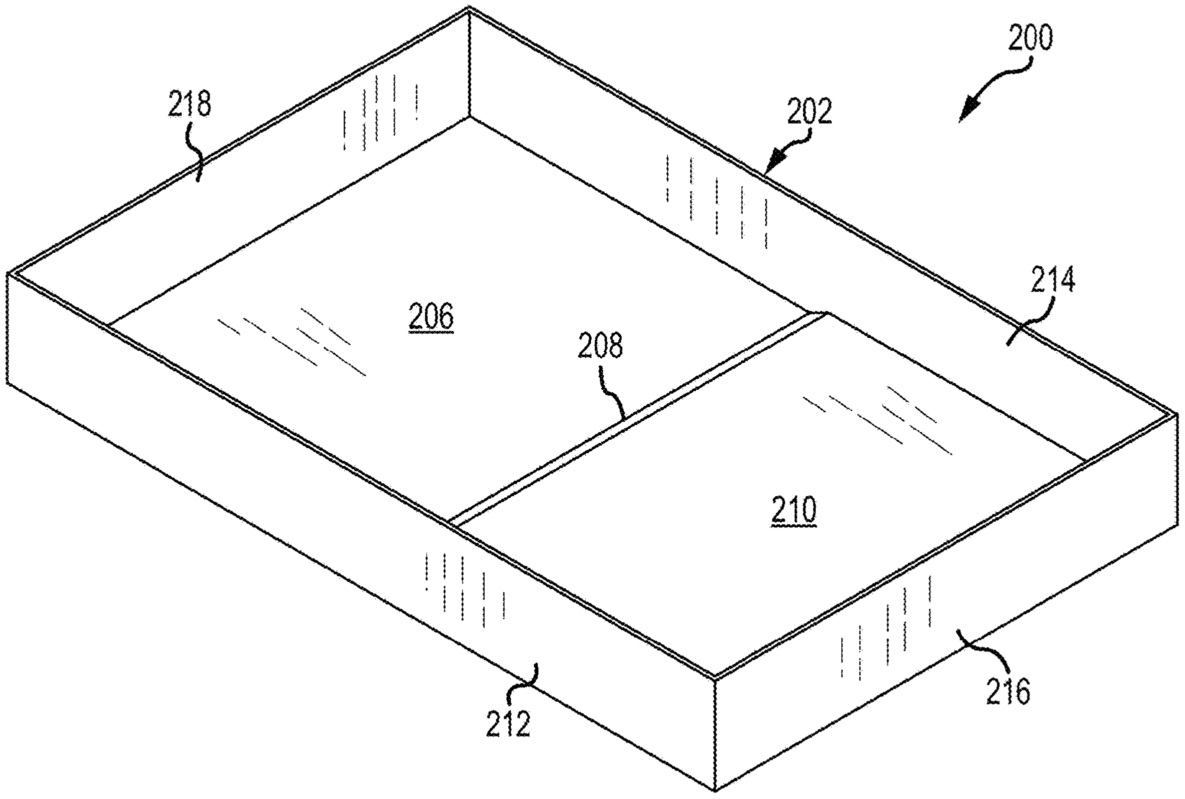
FIG. 5 is a perspective view of a second embodiment of a baking pan in accordance with the present disclosure.

A side view of the baking pan 100 is shown in FIG. 3. The first side wall 112 has a straight rectangular shape with the bottom 104 generally parallel to the top edge 102 of the pan 100. A cross-sectional view of the pan 100 is shown in FIG. 4. In this cross-sectional view, the bottom edge of the first end wall 116 terminates above (e.g., one-fourth inch above, etc.) the bottom edge 120 of the side wall 114 as it forms part of the bottom portion 110 of the pan 100.

An exemplary second embodiment of a baking pan 200 in accordance with the present disclosure is shown in FIGS. 5-8. This example baking pan 200 is an open top box shaped pan that has a rectangular peripheral top edge 202 defining a plane and preferably has a side wall height of about 1¾ inches, a length of about 13 inches, and a width of about 9 inches. This baking pan 200 has a bottom 204 configured with a flat first bottom portion 206 at a depth of about 1¾ inches from the top edge 202 of the pan 200, a short inclined transition portion 208, and a flat second bottom portion 210 raised about ¼ inch from the flat first bottom portion 206. The transition portion 208 preferably smoothly merges the first flat bottom portion 206 with the second flat bottom portion 208 and preferably has a width of about ½ inch to about ¾ inch. The specific dimensions provided in this paragraph and elsewhere are examples only and do not limit the scope of the present disclosure. In alternative embodiments, the baking pan 200 may be configured differently, e.g., dimensionally sized larger or smaller, shaped differently (e.g., non-rectangular, etc.), configured to have more than two levels, etc.

Figure 6:
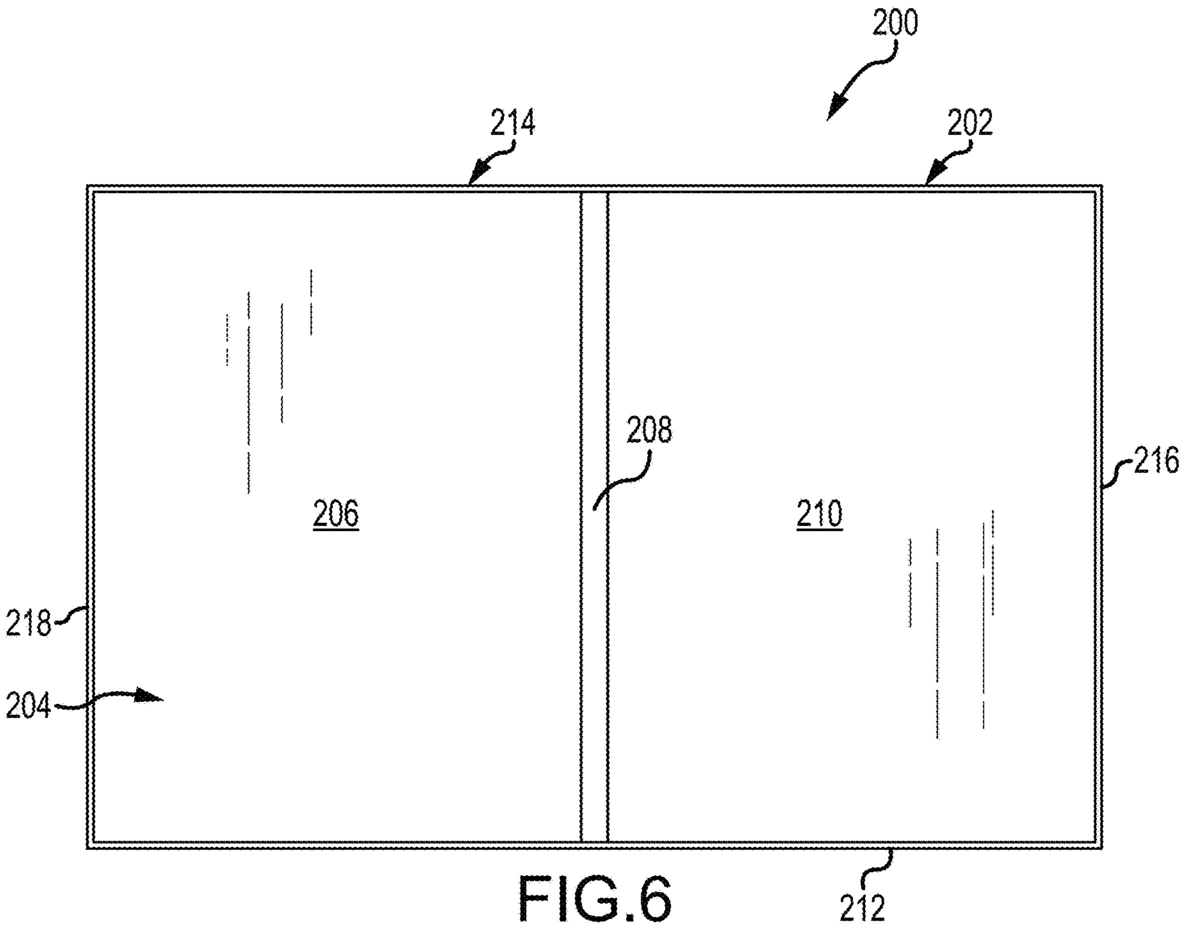
FIG. 6 is a plan view of the baking pan shown in FIG. 5.

A plan view of the exemplary baking pan 200 is shown in FIG. 6. The pan 200 has a first side wall 212, a second side wall 214, a first end wall 216 and a second end wall 218. Each of the side walls 212, 214 and end walls 216, 218 join the bottom 204. The upper edges of the side walls 212, 214 and end walls 216, 218 together form a peripheral top edge 202. The bottom edges 220 of at least the side walls 212, 214 and end wall 218 lie in a plane generally parallel to the top edge 202 of the pan 200. The bottom edge of the end wall 216 may lie above the bottom edges of the side walls 212, 214 as shown in the cross-sectional view of FIG. 8. Alternatively the second bottom portion 210 of the bottom 204 may be butted against the first end wall 216 during fabrication such that the bottom edge of the first end wall 216 matches the bottom edge of the first and second side walls 212, 214.

Figure 7:
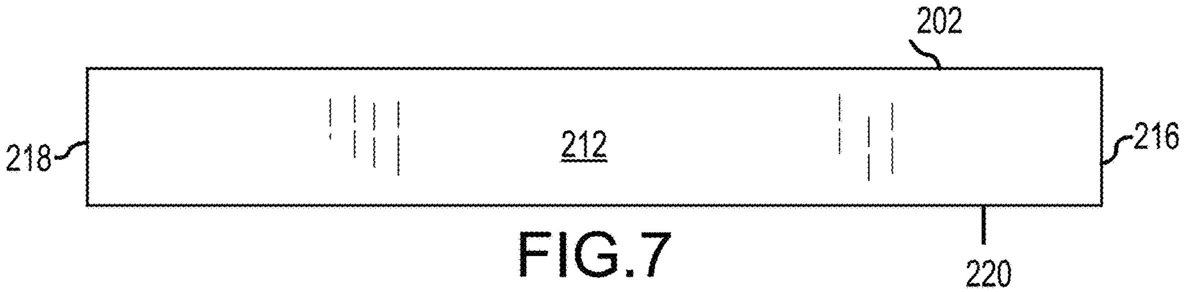
FIG. 7 is a side view of the baking pan shown in FIG. 5.
Figure 8:
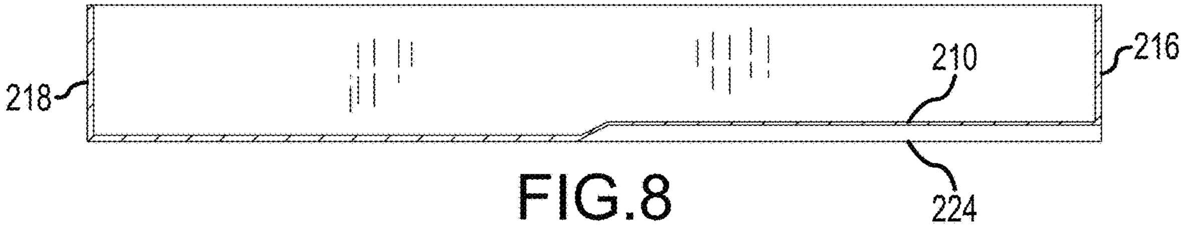
FIG. 8 is a cross-sectional view of the baking pan shown in FIG. 5.

A side view of the baking pan 200 is shown in FIG. 7. The first side wall 212 has a straight rectangular shape with the bottom 204 generally parallel to the top edge 202 of the pan 200. A cross-sectional view of the pan 200 is shown in FIG. 8. In this cross-sectional view, the bottom edge of the first end wall 216 terminates above (e.g., about ¼ inch above, etc.) the bottom edge 220 of the side wall 214 as it forms part of the bottom portion 210 of the pan 200.

In each of the first and second embodiments of the baking pans 100 and 200, the bottom edges of the sides and second end wall lie in a common plane parallel to the top edge 102, 202 such that when the baking pan 100, 200 is placed in an oven on a level rack the brownie dough or other material in the pan will lie horizontal on the oven rack. When properly cooked, the resulting brownies will have a different consistency depending on the depth of the brownie dough in the pan from the top edge 102, 202.

The two level baking pans 100 and 200 in accordance with the present disclosure may alternatively have a step change between the bottom portions 106, 206 and 110, 210 such that the transition portion 108, 208 is vertical. The bottom may be integrally formed with the side and end walls or may be preferably bonded thereto in such a manner that no leakage between the bottom and side and end walls can occur during cooking. At the same time, the opposite lateral side walls of the baking pan preferably are configured to terminate at a straight bottom edge so that the pan, when placed in or on an oven rack will lie in a plane parallel to the oven rack.

Another exemplary embodiment in accordance with the present disclosure includes a flat bottom baking pan with a separable or removable insert configured to be positioned within the baking pan and sit on the bottom of the baking pan. This separable insert raises the effective bottom of the pan (e.g., about ¼ inch to about ½ inch, etc.) above the normal bottom of the baking pan. When the insert is positioned within the baking pan, the baking pan thus has a two depth configuration with a one portion having a depth (e.g., of about 1¾ inch, etc.) different than the depth (e.g., of about 1½ inches, etc.) of another portion. In this exemplary embodiment, the separable insert preferably has a high heat transmissive characteristic so that the oven heat can uniformly be transmitted through the dough during cooking.

The shape of the open top baking pan in accordance with this disclosure need not have a rectangular shape as illustrated in the figures. Any closed open top pan shape is envisioned as being within the scope of this disclosure. For example, the baking pan may have a generally circular or oblong shape. Alternatively, the baking pan may have an exterior shape in the form of an animal, flower, geometric shape, or any other recognizable object shape.

The transition between the first bottom portion and the second bottom portion may be a vertical step change, or the transition may be slanted, inclined, curved, gradual, etc. Furthermore, the transition need not be in a straight line across the bottom of the pan as illustrated in the figures. For example, the transition may be curved or follow any defined path.

In exemplary embodiments, the baking pan is configured such that the second depth of the second bottom portion from the upper edge of the baking pan is less than or shallower than the first depth of the first bottom portion from the upper edge of the baking pan. The baking pan includes a bottom. The first bottom portion may be integrally defined by an interior portion of the bottom of the baking pan, whereas the second bottom portion may be spaced apart from and above the bottom of the baking pan. At least a portion of the bottom of the baking pan may be generally flat and/or configured such that the baking pan is level when placed on a level oven rack.

In exemplary embodiments, the bottom of the baking pan may include one or more openings therethrough (e.g., thru-holes aligned with and/or underneath the second bottom portion, etc.) that are configured to allow a heated airflow from an oven to flow through the one or more openings to a lower surface of the second bottom portion. This, in turn, may allow the oven heat to be more uniformly transmitted through the dough during cooking. For example, the portion of the bottom 124 disposed underneath the second bottom portion 110 shown in FIG. 4 may include one or more openings therethrough in exemplary embodiments.

In exemplary embodiments, the bottom of the baking pan may define an open area (e.g., an entirely open area between bottom edges of the side walls and end wall, etc.) underneath the second bottom portion. The open area may be configured to allow a heated airflow from an oven to flow through the open area to a lower surface of the second bottom portion. This, in turn, may allow the oven heat to be more uniformly transmitted through the dough during cooking. For example, the area between the second bottom portion 110 and the bottom 124 of the baking pan 100 shown in FIG. 4 may comprise an open area in exemplary embodiments. In such exemplary embodiments, there may be an open area bordered by or defined between the second bottom portion 110 and transition 108 (on the top of the open area) and lower portions of the sidewalls 112, 114 and end wall 116 (on the sides of the open area). Accordingly, the bottom 124 of the baking pan 100 thus does not necessarily need to be continuous and solid across an entire bottom of the baking pan 100 in all embodiments. In different exemplary embodiments, the bottom 124 of the baking pan 100 may have different configurations (e.g., different shapes, sizes, etc.) for supporting the second bottom portion 110 higher than (e.g., about ¼ inch higher than, etc.) the first bottom portion 106 while also maintaining the baking pan 100 level when placed on a level oven rack.

In exemplary embodiments, the second bottom portion is spaced apart from and above the bottom of the baking pan by a spaced distance. And the baking pan includes a sealed airtight cavity defined within the spaced distance between the second bottom portion and the bottom of the baking pan. For example, the spaced distance shown in FIG. 4 between the bottom 124 and the second bottom portion 110 and transition 108 of the baking pan 100 may comprise a scaled airtight cavity in exemplary embodiments. In such exemplary embodiments, the sealed airtight cavity may be bordered by or defined between the baking pan's bottom 124 (on the bottom of the sealed airtight cavity), the second bottom portion 110 and transition 108 (on the top of the sealed airtight cavity), and lower portions of the sidewalls 112, 114 and end wall 116 (on the sides of the sealed airtight cavity).

The exemplary baking pans disclosed herein may be made of any suitable material, such as a metal, glass, ceramic, or a high temperature plastic that can withstand a temperature of at least 100 degrees Celsius. Baking pans for baking cake, bread, banana bread, pie, or other baked goods such as brownies are usually generally rectangular metal or glass pans typically having a depth of between 1 inch and 4 inches. Furthermore, the height difference between the first bottom portion and the second bottom portion may be larger or smaller than ¼ inch. The depths may vary depending on the preferred amount of doneness desired by the baker given the particular content of ingredients within the pan being baked. A ¼ inch difference is merely exemplary and is effective in the case of a typical brownie mix. And the description of brownies is merely exemplary and is particularly effective when baked goods having a variety of doneness is desired. Accordingly, all such alternatives, variations, and modifications are intended to be encompassed within the scope of and as defined by the following claims.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms, and that neither should be construed to limit the scope of the disclosure. In some exemplary embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular exemplary embodiments only and is not intended to be limiting. For example, when permissive phrases, such as "may comprise", "may include", and the like, are used herein, at least one embodiment comprises or includes such feature(s). As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Whether or not modified by the term "about", the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A baking pan for baking a product having different levels of doneness, the baking pan comprising:

a first bottom portion at a first depth from and generally parallel with an upper edge of the baking pan; and a second bottom portion generally parallel with the upper edge of the baking pan, the second bottom portion at a second depth from the upper edge of the baking pan that is different than the first depth of the first bottom portion from the upper edge, the first and second bottom portions being unobstructed from each other;

wherein:

the baking pan is metal, ceramic, or glass;

the baking pan is configured such that the second depth of the second bottom portion from the upper edge of the baking pan is less than or shallower than the first depth of the first bottom portion from the upper edge of the baking pan;

the baking pan includes a bottom;

the second bottom portion is spaced apart from and above the bottom of the baking pan by a spaced distance;

the baking pan includes a sealed airtight cavity defined within the spaced distance between the second bottom portion and the bottom of the baking pan, thereby causing the second bottom portion to reach a different thermal profile than the first bottom portion during baking;

the first bottom portion forms a first baking surface;

the second bottom portion forms a second baking surface at a shallower baking depth than the first baking surface;

the sealed, airtight cavity provides thermal insulation between the second baking surface and the bottom of the baking pan, whereby the baking pan is configured such that a single batch of baking material produces different doneness levels across the first and second baking surfaces during a single bake cycle.

* * * * *